United States Patent [19]

Spaller, Jr.

[11] Patent Number: 5,055,207
[45] Date of Patent: Oct. 8, 1991

[54] FILTRATION OF CELLULOSE ESTER DOPE

[75] Inventor: Albert E. Spaller, Jr., Johnson City, Tenn.

[73] Assignee: Eastman Kodak Company, Rochester, N.Y.

[21] Appl. No.: 590,839

[22] Filed: Oct. 1, 1990

[51] Int. Cl.$^5$ ............................................. B01D 61/00
[52] U.S. Cl. ..................................... 210/805; 210/194;
210/195.1; 210/333.01; 210/335; 210/340;
210/457; 210/793; 210/806
[58] Field of Search ...................... 210/335, 340, 195.1,
210/194, 457, 805, 806, 333.01, 793; 536/69, 70, 80

[56] References Cited

U.S. PATENT DOCUMENTS 4,218,314 8/1980 Schubert et al. ................. 210/23 H
4,313,830 2/1982 Tulin et al. ........................... 210/639

OTHER PUBLICATIONS

F. Gauthier, H. L. Goldsmith and S. G. Mason, "Particle Motions in Non-Newtonian Media. II. Poiseuille Flow", Transactions of the Society of Rheology 15:2, pp. 297–330 (1971).
G. Segre and A. Silberberg, "Radial Particle Displacements in Poiseuille Flow of Suspensions", Nature, p. 209, Jan. 21, 1961.
C. E. Chaffey, H. Brenner and S. G. Mason, "Particle Motions in Sheared Suspensions", XVIII: Wall Migration (Theoretical) Rheologica Act, Band 4, Heft 1, p. 64 (1965).
B. Shizgal. H. L. Goldsmith and S. G. Mason, "The Flow of Suspensions Through Tubes, IV: Oscillatory Flow of Rigid Spheres", The Canadian Journal of Chemical Engineering, p. 97, Jun., 1965.
F. W. Altena and G. Belfort, "Lateral Migration of Spherical Particles in Porous Flow Channels: Application to Membrane Filtration", Chemical Engineering Science, vol. 39, No. 2, pp. 343–355, 1984.
"Axial Migration of Particles in Poiseuille Flow", Nature, p. 1095, Jun. 17, 1961.

Primary Examiner—Robert A. Dawson
Assistant Examiner—David Reifsnyder
Attorney, Agent, or Firm—John F. Stevens; William P. Heath, Jr.

[57] ABSTRACT

Disclosed are method and apparatus for filtering particles and gels from cellulose ester dope by passing the dope in plug flow through a tubular filter so as to cause particles and gels to migrate towards the center of the stream and shear forces along the filter walls to reduce the viscosity so that the boundary layer will exude through the filter walls. The concentrate containing the particles and gels is thereby separated from the filtrate.

9 Claims, 3 Drawing Sheets

FILTRATION OF CELLULOSE ESTER DOPE

TECHNICAL FIELD

This invention relates to apparatus and method for filtering cellulose ester dope of particles and gels so as to improve its quality for processing into articles such as fibers.

BACKGROUND OF THE INVENTION

Before cellulose ester dope can be spun into fine filaments, the undissolved and partially dissolved particles and other contaminants must be removed. Typically this is accomplished with plate and frame filter presses which are slow, expensive and labor intensive.

The improved process provided by this invention is an adaptation of the commonly known cross flow filtration process which has wide application in the beer, wine, and pharmaceutical industries and is easily applied to batch type processes. Normally the fluid to be filtered has a low viscosity and low solids loading.

Cellulose ester dope is a thick, viscous liquid which is quite shear sensitive, that is, when sheared the viscosity is lowered. For example, when the dope is pumped through a tube, the layer of dope along the tube wall is subjected to high shear stresses, hence the viscosity of that layer is reduced. This results in a plug flow. Also experimental results indicate that particles in a high viscosity fluid flowing in a tube tend to migrate away from the high shear region and towards the center of the tube. If the tube wall is porous, then the lower viscosity fluid produced in the wall boundary area will exude through the wall while most particles will be retained with the parent flow, thereby concentrating the parent flow. If the parent flow is continually circulated in the filter tube, the parent flow would become more and more concentrated as filtrate is removed from the parent flow. If raw dope is introduced as a sheath around this parent flow just prior to the filter, the filter could separate the gels and contaminates from the raw dope. Of course not all particles are contained in the parent stream and some will adhere to the filter wall. These particles will eventually start blinding the filter. When this occurs, most of these particles can be removed by a simple backflushing of the filter wall with the clean filtrate. After several backflushings, sufficient particles may be tightly bound to the filter wall and a more thorough cleaning may be required.

Of interest are U.S. Pat. Nos. 4,218,314 and 4,313,830, as well as publications mentioned hereinafter.

DESCRIPTION OF THE INVENTION

Figure 1:
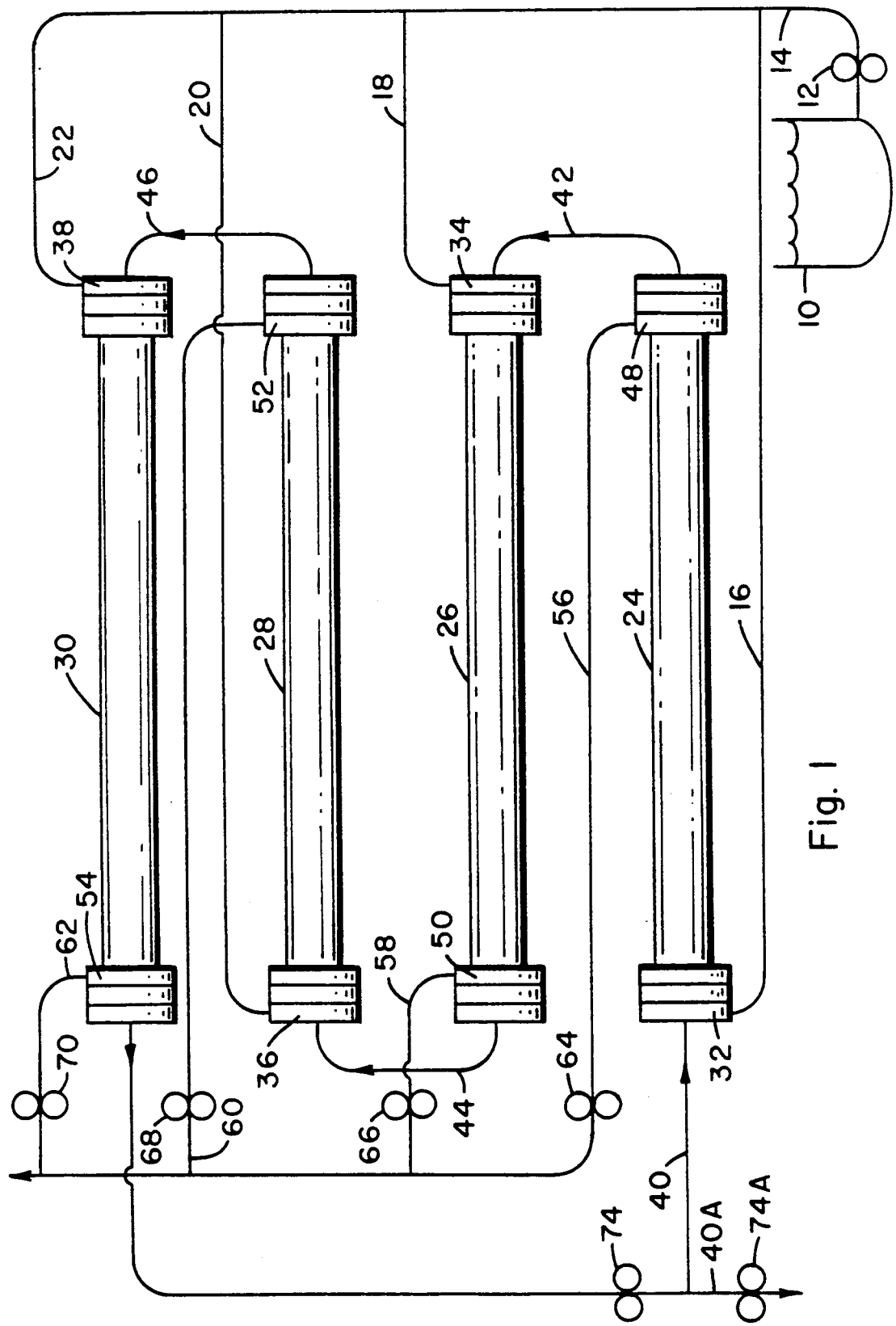
FIG. 1 is a schematic view illustrating the process and apparatus of the present invention.

According to the present invention, there is provided a method of filtering particles or gels from cellulose ester dope comprising the steps of 1. causing the dope to flow through an elongated tubular filter under sufficient velocity to cause plug flow whereby high shear along the filter wall causes (a) particles or gels to migrate away from the filter wall towards the center of the flow and (b) the layer of dope at the filter wall to have a reduction in viscosity sufficient to exude therethrough at a pressure difference across the wall of the filter of less than 200 psi to thereby form a filtrate and a concentrate, and 2. capturing the filtrate and concentrate in separate liquid-containing means.

Also, according to the present invention, there is provided apparatus for filtering materials such as particles and gels from a cellulose ester dope comprising 1. elongated cylindrical conduit, 2. a tubular filter of smaller outside diameter than the inside diameter of the conduit extending coaxially therewith, the filter being of a porosity such as to allow cellulose ester dope having solids and gels less than about 10 microns to exude therethrough at a pressure differential across the filter of less than 200 psi, 3. means for causing cellulose ester dope to flow through the filter at sufficient velocity to cause plug flow whereby high shear along the filter wall causes particles or gels to migrate away from the filter wall towards the center of the flow and the layer of dope at the filter wall to exude through the filter wall to separate the dope into a filtrate and a concentrate, and 4. means for capturing the filtrate and concentrate in separate liquid-containing means.

Cellulose ester dope which may be filtered in accordance with the present invention includes cellulose acetate, cellulose propionate, cellulose butyrate and mixed esters thereof such as cellulose acetate propionate. This invention is particularly applicable to cellulose acetate. These cellulose esters may be produced in a variety of acyl and hydroxyl contents and viscosities. Conventional solvents for making dope include acetone and methylene chloride. Dope, as is well known in the art, is simply a solution of the ester, normally having a solids content of about 20-30% by weight, producing viscosities of about 75,000-200,000 poise at 20°-40° C.

The undissolved particles or gels to be filtered from the dope are normally impurities and incompletely dissolved ester particles having a size of greater than about 10 microns mean diameter. Such solids and gels have a tendency to interfere with spinning fibers and other processing steps, as well as producing flaws in products such as fibers made from the dope.

According to the present invention, cellulose ester dope as described above is filtered (i.e., particles or gels are removed) by directing the dope axially through an elongated tubular filter at a velocity such as to produce plug flow (non-Newtonian flow) whereby particles or gels are caused to migrate away from the filter wall towards the center of the flow, and allowing the reduced-viscosity dope at the filter wall which is under high shear to exude through the filter wall, thereby separating the dope into a filtrate and a concentrate.

It is well known in the art that liquids which contain particles flowing in non-Newtonian plug flow through a cylindrical conduit have certain characteristics. For example, particles will migrate radially inwardly towards the axis of the flow, and the boundary layer at the wall of the conduit which is under high shear will have a reduction in viscosity. See, for example, the following articles:

1. F. Gauthier, H. L. Goldsmith and S. G. Mason, "Particle Motions in Non-Newtonian Media. II. Poiseuille Flow", Transactions of the Society of Rheology 15:2, pp 297-330 (1971)

2. G. Segre and A. Silberberg, "Radial Particle Displacements in Poiseuille Flow of Suspensions, Nature, p 209, Jan. 21, 1961

3. C. E. Chaffey, H. Brenner and S. G. Mason, "Particle Motions in Sheared Suspensions", XVIII: Wall Migration (Theoretical) Rheologica Act, Band 4, Heft 1, p 64 (1965)

4. B. Shizgal, H. L. Goldsmith and S. G. Mason, "The Flow of Suspensions Through Tubes, IV: Oscillatory Flow of Rigid Spheres", The Canadian Journal of Chemical Engineering, p 97, June, 1965

5. F. W. Altena and G. Belfort, "Lateral Migration of Spherical Particles in Porous Flow Channels: Application to Membrane Filtration", Chemical Engineering Science Vol 39, No. 2, pp 343-355, 1984

6. "Axial Migration of Particles in Poiseuille Flow", Nature, p 1095, June 17, 1961

Referring to the drawings, especially FIG. 1, cellulose ester dope is supplied from container 10 by pump 12 through pipe 14 to supply pipes 16, 18, 20 and 22, which direct raw dope to the inlets of filter assemblies 24, 26, 28 and 30, respectively. The filter assemblies each have an inlet manifold, identified as 32, 34, 36 and 38 respectively, which will be described in detail hereinafter.

The first filtering assembly 24 is supplied raw dope through pipe 16, and is also supplied recycling dope from pipe 40. The filtering assemblies 24, 26, 28 and 30 are connected in series, i.e., partially filtered dope from the outlet of one into the inlet manifold of the next, by pipes 42, 44 and 46. Filtrate from each assembly is captured in outlet manifolds 48, 50, 52 and 54 respectively, and directed through pipes 56, 58, 60 and 62 to a filtrate collecting vessel, not shown, by pumps 64, 66, 68 and 70 respectively. Concentrate from the discharge of the last filter assembly 30 in the series is captured in line 72 and routed by pump 74 to the inlet of the first filter of the series (24). A waste steam is removed through line 40A by pump 74A and routed to a dump vessel. This flow is typically less than 1% of total.

Filtrate pumps 64, 66, 68 and 70 are used for controlling the filtering rate and backwashing the filter assemblies when they become clogged. Backwashing is accomplished by techniques well known by those skilled in the art.

Figure 2:
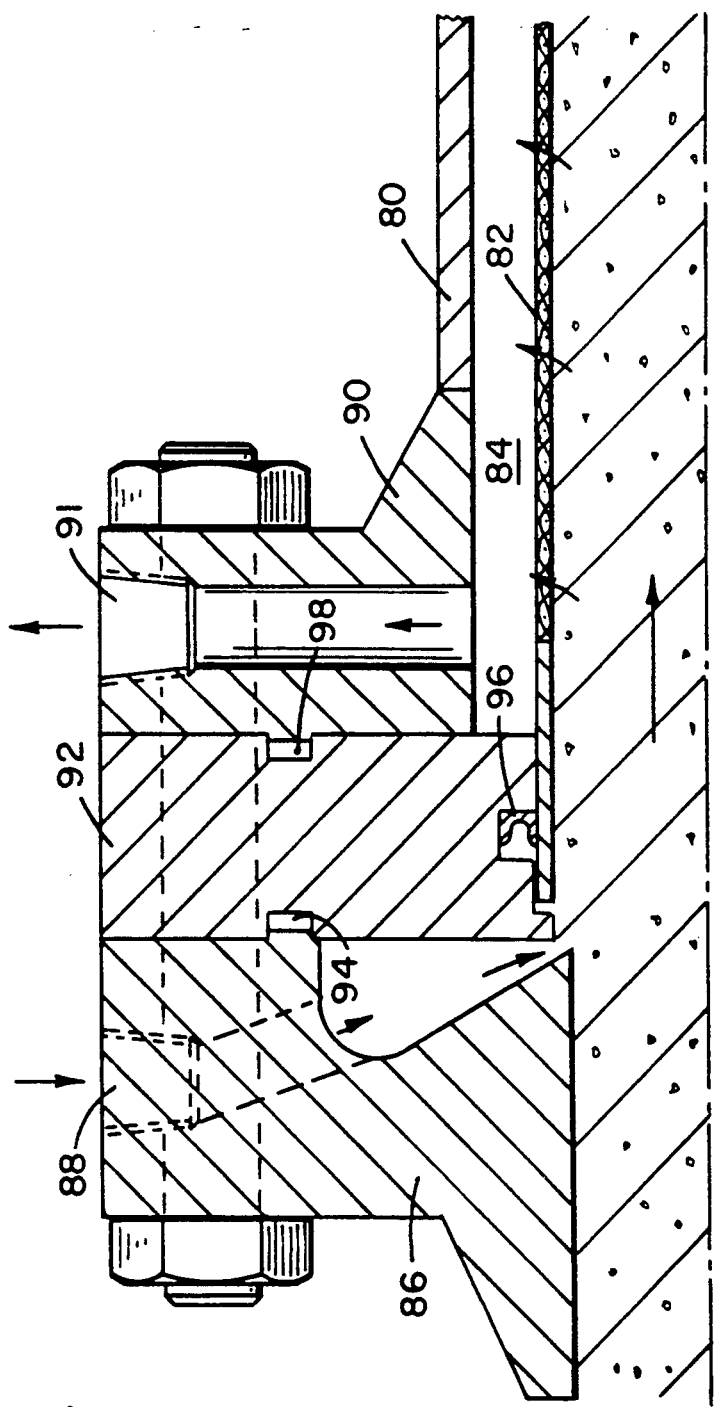
FIG. 2 is an enlarged sectional view of a combination inlet-outlet manifold for use in the filtering assembly according to this invention.
Figure 3:
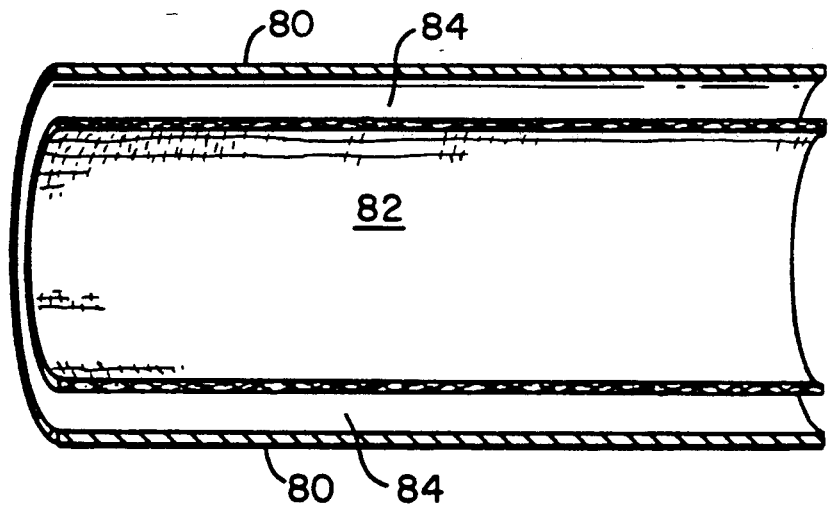
FIG. 3 is a sectional view of the filtering assembly according to this invention.

FIG. 2 illustrates in detail a typical manifold assembly. This figure differs in arrangement slightly from that shown in FIG. 1, in that in FIG. 2, the raw dope is being fed in and filtrate is being withdrawn at the same end of the filter assembly. FIG. 1 shows raw dope being fed in one end and the filtrate being withdrawn from the other. However, it will be realized by those skilled in the art that the filtrate can be withdrawn at any point along the length of the filter.

As shown in enlarged section in FIG. 2, the filtering assembly comprises an elongated cylindrical conduit 80, inside which is contained a tubular filter 82 of smaller outside diameter than the inside diameter of conduit 80 and in coaxial alignment therewith so as to define an annular chamber 84 between the conduit 80 and filter 82. The assembly includes a manifold 86 communicating with the inside of filter 82 having an inlet 88 for raw dope, and an outlet manifold 90 communicating with the annular space 84 between the conduit 80 and filter 82 for allowing filtrate to escape through outlet 91.

Spacer 92 is provided for containing suitable seals 94, 96 and 98 for properly containing the liquids.

Figure 4:
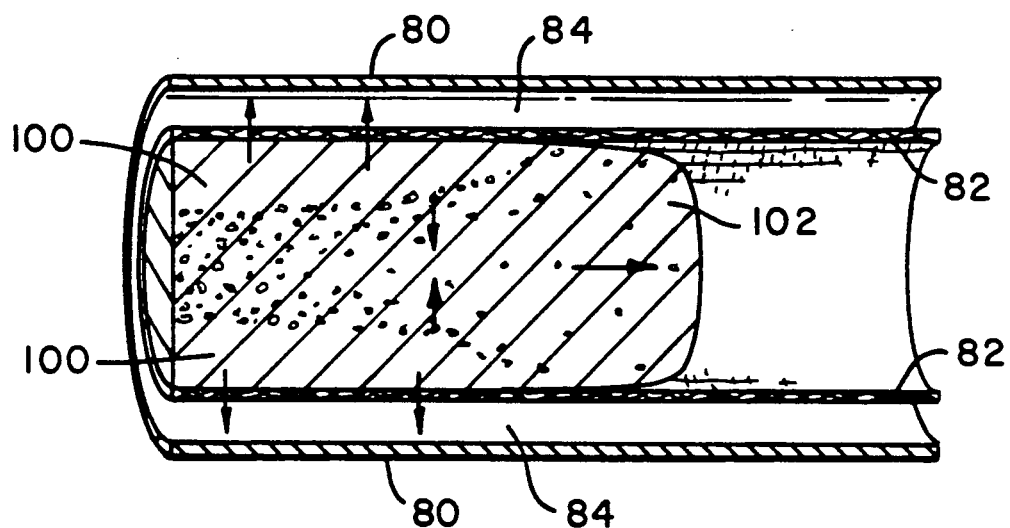
FIG. 4 is a sectional view similar to FIG. 3, but showing a profile of liquid flow in the filtering assembly.

Cellulose ester dope is caused to flow in non-Newtonian plug flow in the direction of the arrow so as to achieve a boundary layer 100 (shown exaggerated in FIG. 4) under high shear and reduced viscosity for exuding through the filter into annular chamber 84. FIG. 4 illustrates diagrammatically a velocity profile and particle movement found in plug flow, wherein particles or gels 102 migrate towards the center of the flow, away from the filter wall 82.

The filter 82 is preferably made of several layers of metallic screen wire, e.g., stainless steel. The inside layer, which filters the dope, has a pore size of about 10 microns. The outer layers provide support for the filtering layer to prevent rupture due to pressure differences, and preferably have larger pore sizes of, for example, ranging up to 200 microns. The layers of screen may be permanently laminated by any suitable process depending on the material used.

The following are typical conditions for filtering cellulose ester dope.
cellulose ester-cellulose acetate
solvent-acetone
dope—about 20-30 wt % solids
viscosity of dope—about 75,000-200,000 poise at 20°-40° C.
minimum flow rate—1 ft/sec.
pressure difference between inside and outside of filter—about 20-200 psi
filter—10 layers of stainless steel screen wire; inner layer has opening size of 10 microns; layers have progressively larger pore sizes with increasing radii up to about 200 microns
filtrate recovered—about 10% of flow per 4 ft length
diameter of filter—about 1.5 inch
diameter of conduit—about 2.067 inside diameter The process begins by filling the system with raw dope. After the system is filled, filtration begins by starting the filtrate/backflush pumps. The output of the raw dope pump and the filtrate/backflush pumps determine the filtrate output. The pressure difference across the filter is monitored. As particles collect on the filter wall and the filter begins to clog, this pressure difference will increase. When this pressure difference reaches a critical level (as determined when gels are beginning to be extruded through the filter) the filtrate/backflush pump for that filter is stopped and then reversed to flush the contaminates back into the parent stream to be carried away from the filter. Because the velocity of the concentrate stream is high, it should help scour the filter wall and keep most gels and contaminates from coming into binding contact with the filter wall.

As the filtering process continues, the concentrate stream increases in gel and contaminate concentration. After the concentrate stream reaches a critical level (as determined by pumping power to pump the more viscous material) a side stream of the concentrate can be continuously removed for subsequent processing. This stream would be expected to have extremely high levels of gels and contaminates.

Cellulose ester dope filtered by this process is generally free of large particles and gels which would interfere with processing such as spinning.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

I claim:

1. Method of filtering solids or gels from cellulose ester dope comprising the steps of
   A) causing said dope to flow through an elongated tubular filter under sufficient velocity to cause plug flow whereby high shear along the filter wall causes (a) solids or gels in said dope to migrate away from the filter wall towards the center of the flow and (b) the layer of said dope at the filter wall to have a reduction in viscosity sufficient to exude therethrough at a pressure difference across the wall of the filter of less than 200 psi to thereby form a filtrate and a concentrate, and
   B) capturing said filtrate and concentrate in separate liquid-containing means.

2. Method according to claim 1 wherein said liquid is caused to flow through two or more filters in series.

3. Method according to claim 1 wherein said concentrate is recycled through said filter.

4. Method according to claim 1 wherein said concentrate is recycled with unfiltered liquid through said filter.

5. Method according to claim 4 wherein said unfiltered liquid is introduced into said filter as an annular sleeve around said recycled concentrate.

6. Method according to claim 1 wherein said filtrate is periodically flushed back through the filter in reverse to provide a cleaning action on said filter.

7. Method according to claim 1 wherein the cellulose ester dope is cellulose acetate.

8. Method according to claim 1 wherein said filter is self-supporting under said pressure difference.

9. Method according to claim 1 wherein said filter has an effective pore size of about 10 microns.

* * * * *